United States Patent [19]

Fletcher

[11] 4,093,035
[45] June 6, 1978

[54] FLUID MILL POWERED VEHICLE

[76] Inventor: Orval K. Fletcher, Rte. 2, Bruce, Wis. 54819

[21] Appl. No.: 803,220

[22] Filed: Jun. 3, 1977

[51] Int. Cl.² .............................................. B60K 1/00
[52] U.S. Cl. .............................. 180/65 DD; 290/44; 416/117
[58] Field of Search ............. 180/65 DD; 290/44, 55; 416/117, 122

[56] References Cited

U.S. PATENT DOCUMENTS

| | | | |
|---|---|---|---|
| 1,319,766 | 10/1919 | Gracey | 416/117 |
| 1,915,689 | 6/1933 | Moore | 290/55 |
| 3,374,849 | 3/1968 | Redman | 180/65 DD |
| 3,878,913 | 4/1975 | Lionts et al. | 180/65 DD |
| 3,920,354 | 11/1975 | Decker | 416/117 |
| 4,012,163 | 3/1977 | Baumgartner et al. | 180/65 DD |

*Primary Examiner*—David M. Mitchell
*Attorney, Agent, or Firm*—Cahill, Sutton & Thomas

[57] ABSTRACT

A fluid mill having a tandem set of vanes is mounted within a vehicle and subject to the air stream during forward motion of the vehicle. Rotation of the sets of vanes in response to the force of the air stream drives an electrical generator which supplies charging current to a bank of batteries. Electrical power available from the bank of batteries is harnessed to energize one or more electric motor driven wheels of the vehicle. During deceleration of the vehicle, the wheel mounted electric motors act as electric generators and provide further charging current for the bank of batteries.

7 Claims, 4 Drawing Figures

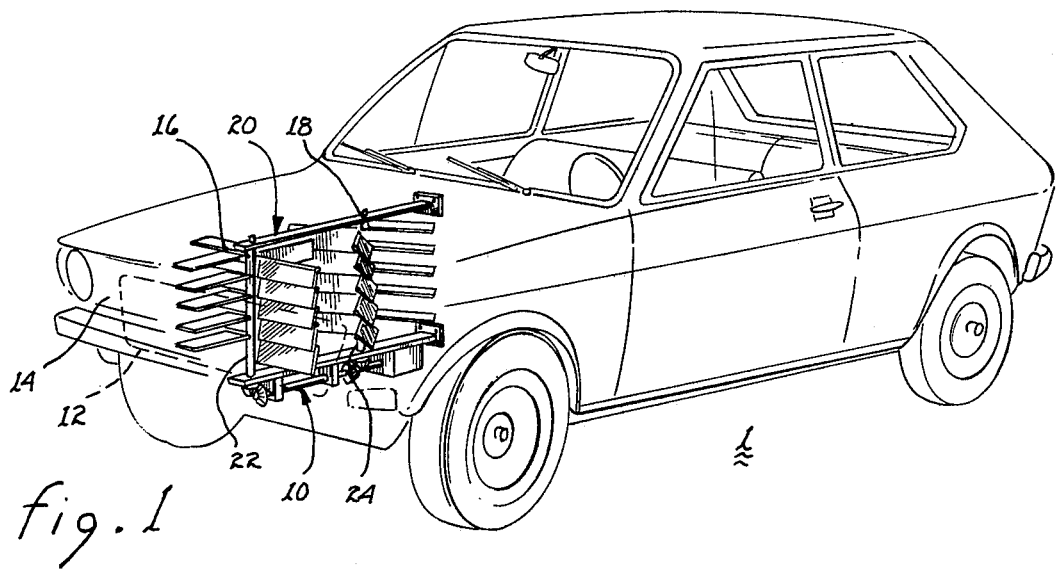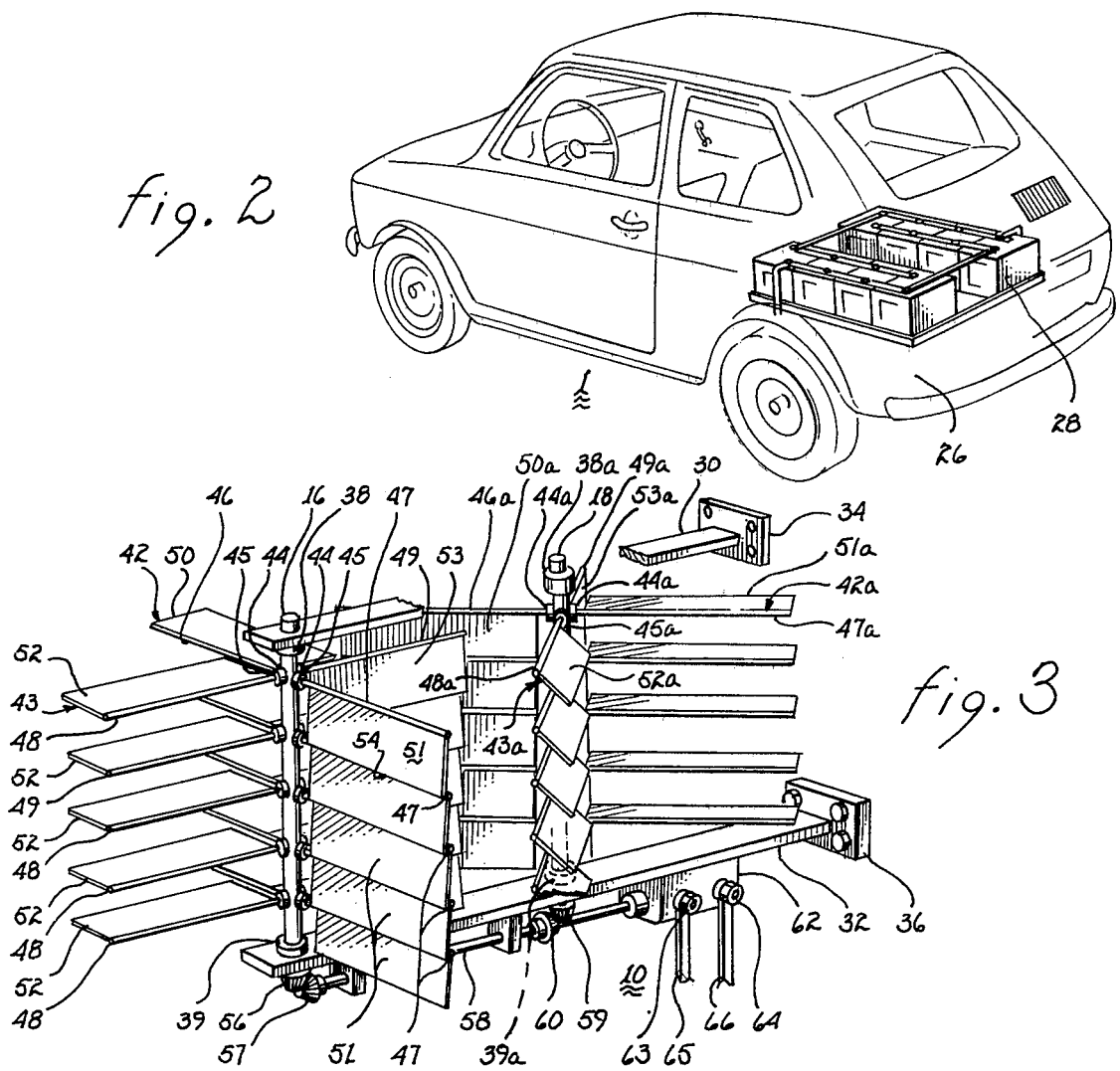

FLUID MILL POWERED VEHICLE

The present invention relates to electrically powered vehicles and, more particularly, to electric powered vehicles which at least partially recharge the supply of electric current while under way.

The development of electrically powered vehicles has been in process for decades and various solutions have been proposed, none of which have had sufficient practical merit to warrant large scale commercialization. One of the inherent problems with any electrically powered vehicle is that of recharging the source of power, the batteries. Nominally, each hour's use requires from two to four hours of recharging time. Although some progress has been made with respect to rapid charging of batteries, the batteries suitable therefor which also have sufficient capacity are far too expensive for general public use.

To prolong the driving time available from a set of batteries within an automobile, many proposals have been presented whereby the driving electric motors are converted into generators during deceleration and while the vehicle coasts downhill. This solution has merit but the amount of recharging which is effected is insufficient to prolong the capacity of the batteries for a satisfactory extension of time.

It is therefore a primary object of the present invention to provide a source of power for recharging the batteries of an electric powered vehicle while the vehicle is under way.

Another object of the present invention is to provide a source of power for recharging the batteries of an electric powered vehicle which does not impose excessive drag or other loads during forward motion of the vehicle.

Yet another object of the present invention is to provide a fluid mill useable with vehicles for recharging a bank of batteries.

Still another object of the present invention is to provide a fluid mill which effectively absorbs energy from an ambient air stream.

A further object of the present invention is to provide a fluid mill for recharging the batteries of an electric powered vehicle, which fluid mill is positionable within the chassis of conventional vehicles.

A yet further object of the present invention is to provide a means for continuously recharging the bank of batteries of an electric powered vehicle while the vehicle is under way.

A still further object of the present invention is to employ both the air stream available while a vehicle is under way and deceleration as sources for generating a recharging current to an electrically powered vehicle.

These and other objects of the present invention will become apparent to those skilled in the art as the description thereof proceeds.

The present invention may be described with greater specificity and clarity with reference to the following figures, in which:

FIG. 1 is a perspective view of a vehicle having a fluid mill mounted therein;

FIG. 2 is a perspective view of a vehicle having a bank of batteries mounted therein;

FIG. 3 is a perspective view of a fluid mill mountable within the chassis of an electric powered vehicle;

Figure 4:
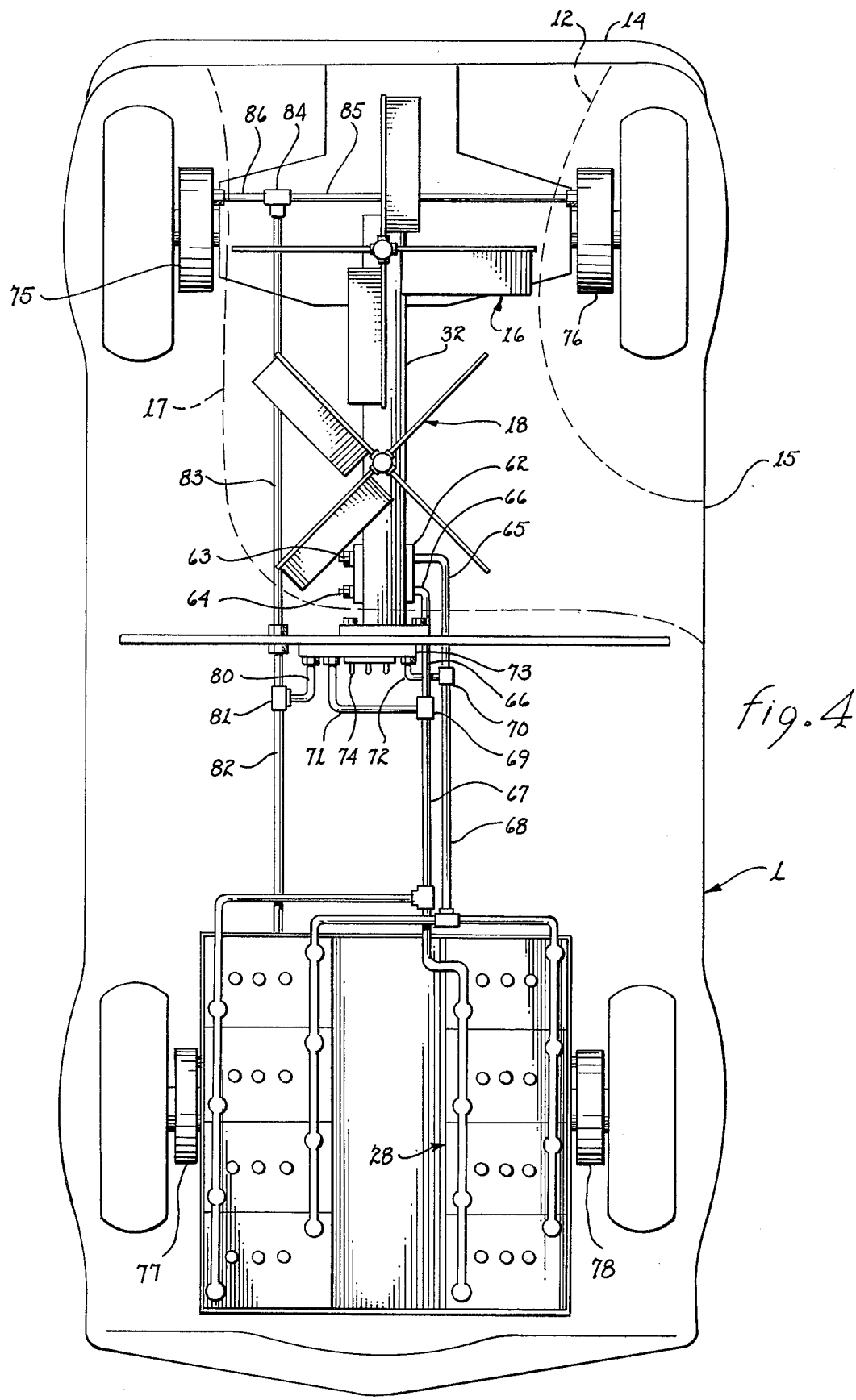
FIG. 4 is a top view of an electric powered vehicle having a fluid mill disposed therein.

Referring to FIG. 1, there is shown an electric powered vehicle 1 having a fluid mill 10 disposed within the engine compartment. A scoop 12 is developed within grill 14 of the vehicle to permit the inflow of air into the engine compartment during forward motion of the vehicle. The inflowing air may be discharged through large vents in the sides of the vehicle or downwardly through the bottom of the engine compartment. The inflowing air strikes the first and second sets of vanes, 16 and 18, of fluid mill 10. The striking or impacting air flow causes shafts 22 and 24, supporting vane sets 16 and 18, respectively, to rotate within their respective journals. As will be described in further detail below, the motion of the rotating shafts is translated to drive an electric generator or alternator to produce electric current.

As shown in FIG. 2, trunk 26 of vehicle 1 is used in part to store a bank of batteries 28. These batteries, normally connected in parallel, provide electric power to each electric motor driving one or more of the wheels of the vehicle. The output of the fluid mill powered electric generator is directed to bank of batteries 28 to continuously charge the batteries during forward motion of the vehicle.

As is well known to aerodynamisists working with vehicular designs, the amount of drag generated by a vehicle during forward motion is a function of the degree to which the vehicle is streamlined. The vehicle illustrated in FIGS. 1 and 2 is of essentially conventional design for compact or subcompact vehicles. Accordingly, the air flowing around and about the vehicle presents a given quantity of drag for any given speed of the vehicle. If the air striking the grill or forward portion of the vehicle is permitted to enter the interior of the vehicle through an air scoop and flow out of the vehicle through side, bottom or top mounted outlets, little difference in overall drag will occur. Accordingly, if the air stream can be employed to perform useful work, greater efficiency in propelling the vehicle will be realized. It is upon the basis of this principle that the present invention is predicated. To accomplish the above goal, fluid mill 10 is disposed within the vehicle whereby it imposes no additional protrusion to the air stream.

Turning now to FIG. 3, the details of fluid mill 10 will be reviewed. Frame members 30 and 32 are attached to the firewall of vehicle 1 through brackets 34 and 36. The frame members support journalled axles 22 and 24. Collets 38 and 39 are employed to prevent excessive longitudinal movement of axle 22 and collets 38a and 39a serve a similar function for axle 24. Sets of levers 42 and 43, orthogonally oriented with respect to one another are penetratingly and rotatably mounted upon axle 22 to form set of vanes 16. Ferrules 44 and 45, mounted upon levers 42 and 43, respectively, prevent excessive longitudinal movement of the levers. Levers 42 and 43 have opposite arms 46, 47 and 48, 49, which bear vanes 50, 51 and 52, 53. As illustrated in FIG. 3, vanes 50 and 51 on opposed arms 46 and 47 are rigidly attached at an angle of 90° relative to one another. Vanes 52 and 53 are similarly oriented and attached to arms 48 and 49. As set of vanes 18 mounted upon axle 24 is identical to set of vanes 16 mounted upon axle 22, the same reference numerals as described above will be used with the addition of a subscript "$a$".

When the set of vanes mounted upon axle 22 is subjected to an air stream, vanes 51 attached to arm 47 will be rotated about the axis of the arm until bottom edge 54 of vane 51 bears against an adjoining arm 47, which arm acts as a stop member. Simultaneously, vane 50 will rotate about the axis of arm 46 until it is in alignment with the striking air stream. At this point in the operation of the fluid mill, vanes 51 are in the driving position, in which position they cooperate to present a single broad surface to the current. When vanes 51 are in a driving position, vanes 50, which are normal to the plane of vanes 51, assume the feathered position presenting only the edges of the vanes to the force of the air stream. As axle 22 rotates in response to the driving force of the air stream, the respective positions of vanes 51 and 50 are changed. Upon rotation of axle 22 180°, vanes 51 will be urged to the feathered position by the force of the air stream and vanes 50 will rotate to the driving position and become subjected to the force of the air stream. The operation of vanes 52 and 53 is identical to that of vanes 50 and 51, described above.

It can be readily understood that the vanes disposed on levers 42 and 43 are only driven by half of the flow of the air stream. To take advantage of the other half of the air stream, vanes 50 and 50a are so disposed that vanes 50 assume the feathered position when vanes 50a have assumed the driving position. Thus, one group of vanes of set of vanes 16 mounted upon axle 22 engages one-half of the air stream while another group of vanes of set of vanes 18 mounted upon axle 24 engages the remaining half of the air stream and the full power of the air stream is applied to the fluid mill. Viewing the fluid mill from the source of the impinging air stream, group of vanes 51 cover the right half of the air stream while group of vanes 50a cover the left half. As axles 22 and 24 rotate, the vanes on the arms of the levers are advanced to the driving position from the feathered position and again cover the left and right sides of the air stream, as described above. When viewed from above, axle 22 rotates counterclockwise with the force of the air stream whereas axle 24 rotates clockwise under force of the air stream.

The motion imparted to axles 22 and 24 by sets of vanes 16 and 18 is translated into harnessable energy by means of bevel gears 56 and 57 interconnecting axle 22 with a rotatably mounted shaft 58. Similarly, beveled gears 59 and 60 translate the rotary motion of axle 24 to shaft 58. Shaft 58 drives an electric generator (DC) or alternator disposed within housing 62 attached to frame member 32. The electrical output of the generator is tapped at terminals 63 and 64 by electrical conductors 65 and 66.

The fluid mill described above embodies a number of advantages in its simplicity of construction. The provision for using adjoining levers 42 and 43 as stops for the edges of vanes 50, 51, 52 and 53 dispenses with the necessity for providing complicated stop devices for each of the individual vane and lever arrangements. The number of moving parts in the fluid mill are technically uncomplicated with a resulting little likelihood of malfunction. Accordingly, problems of maintenance are minimal in nature.

The operative relationships between fluid mill 10, battery 28 and vehicle 1 will be described with respect to FIG. 4. Sets of vanes 16 and 18 of fluid mill 10 are mounted within the engine compartment of vehicle 1 rearward of grill 14. The scoop, such as scoop 12 illustrated in phantom lines conveys an air stream through grill 14 past the extremities of the fluid mills and vents the air stream to the side of the car through outlet 15. Shroud 17, extending intermediate scoop 12 and outlet 15, is configured with a cross-sectional dimension so as to encircle the sets of vanes and provide a smooth streamlined transition from the scoop to the outlet to minimize air pressure losses. Alternatively, outlet 15 may be disposed at the floor of the engine compartment or the outlet may include dual outlets on either side of the vehicle.

The power from bank of batteries 28 is conveyed through electrical conductors 67, 68, junction boxes 69, 70 and electrical conductors 71, 72 to an electrical control panel 73. Power from the control panel, through switches 74, is conveyed to electric motors 75, 76, 77 and 78, one of which motors provides a motive force at each of the wheels of the vehicle. Electrical power to each of the motors is conveyed through electrical conductor 80 from control panel 73 to junction box 81. From junction box 81, power is conveyed to electric motors 77 and 78 at the rear wheels through electrical conductor 82. Electrical power to the front wheels is conveyed from junction box 81 through electrical conductor 83, junction box 84 and electrical conductors 85 and 86. The plurality of switches 74 disposed upon control panel 73 regulates the flow of power to bank of batteries 28 from the electric generator disposed within housing 62. Control of the flow of power from the bank of batteries to each of the individual electric motors may be effected by switches 74 or by a foot pedal. Additionally, further manual switches may be incorporated to transmit power from electric motors 75, 76, 77 and 78 to the bank of batteries when the vehicle is decelerating or coasting downhill.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In an electric powered vehicle having a source of electric power supplying power to at least one electric motor operatively connected to a wheel of the vehicle, the improvement comprising in combination:
    a. a fluid mill for developing power in response to an air stream flowing therepast, said fluid mill comprising in combination:
        i. frame members secured to the vehicle for supporting said fluid mill;
        ii. at least one pair of axles journalled in said frame members normal to the flow of the air stream;
        iii. a plurality of spaced levers journalled in each axle of said pair of axles and having opposite arms extending from said axle, each of said levers being axially spaced along the respective one of said axles;
        iv. a first set of vanes disposed about one of said axles and a second set of vanes disposed about another of said axles, each said set of vanes comprising: a first and a second group of vanes fixedly projecting from said opposite arms, the plane of said first group of vanes being normal to the plane of said second group of vanes, said vanes being sized to engage the axially adjacent ones of said levers, said vanes having a driving position wherein said vanes engage adjacent levers and present their broad surfaces to the force of the air stream and a feathered position wherein said vanes present their respective cantilevered journalled arm to the force of the air stream, said driving and feathered positions being reversible as said axle rotates, whereby the force of the air stream bearing on each group of vanes simultaneously causes one group of vanes to assume the driving position and the other group of vanes to assume the feathered position, the functions of the groups of vanes alternating as the force of the air stream against the group of vanes in the driving position turns said levers which in turn rotate the said axle;

b. means for taking power off of each said pair of axles for transmission to a point of use;

c. means for producing electrical power in response to said power take off means; and d. means for transmitting the electrical power to charge the electric power source;

whereby, motion of the vehicle produces an air stream to operate said fluid mill and charge the electric power source.

2. The improvement as set forth in claim 1 wherein said axles of each said pair of axles rotate in opposite directions to intercept differing portions of the air stream to the group of driving vanes associated with each said set of vanes.

3. The improvement as set forth in claim 2 wherein said plurality of spaced levers include pairs of normally oriented levers.

4. The improvement as set forth in claim 3 including a control panel for regulating and controlling the flow of electric power to and from said electric power source.

5. The improvement as set forth in claim 3 wherein said vehicle includes a scoop for receiving the air stream, a shroud for directing the air stream past said fluid mill and an outlet for discharging the air stream.

6. The improvement as set forth in claim 5 wherein said scoop is disposed at the forward end of said vehicle and said shroud is disposed rearward of said scoop.

7. The improvement as set forth in claim 5 wherein said fluid mill and said shroud are disposed within the chassis of said vehicle.

* * * * *